US008237606B2

(12) United States Patent
Molin et al.

(10) Patent No.: US 8,237,606 B2
(45) Date of Patent: Aug. 7, 2012

(54) UHF RADAR SYSTEM FOR IMPLEMENTING A METHOD OF ELIMINATING VEGETATION CLUTTER

(75) Inventors: Paul Molin, Paris (FR); Yves Ricci, Courbevoie (FR)

(73) Assignee: Thales Deutschland GmbH, Stuttgart, DE (US)

( * ) Notice: Subject to any disclaimer, the term of this patent is extended or adjusted under 35 U.S.C. 154(b) by 0 days.

(21) Appl. No.: 12/965,721

(22) Filed: Dec. 10, 2010

(65) Prior Publication Data

US 2011/0254726 A1    Oct. 20, 2011

(30) Foreign Application Priority Data

Dec. 11, 2009  (FR) ...................................... 09 06003

(51) Int. Cl.
*G01S 13/62* (2006.01)
(52) U.S. Cl. ............ 342/28; 342/159; 342/162; 342/95; 342/114; 342/115
(58) Field of Classification Search .................... 342/28, 342/25 R, 25 A, 25 B, 25 E, 25 F, 107–115, 342/159, 162, 195
See application file for complete search history.

(56) References Cited

U.S. PATENT DOCUMENTS

| | | | | |
|---|---|---|---|---|
| 3,905,032 | A | * | 9/1975 | Truel et al. ........................ 342/90 |
| 4,992,795 | A | | 2/1991 | Lassallette et al. |
| 5,568,151 | A | * | 10/1996 | Merritt ........................... 342/192 |
| 5,657,251 | A | * | 8/1997 | Fiala ............................. 342/162 |

(Continued)

FOREIGN PATENT DOCUMENTS

| | | |
|---|---|---|
| EP | 0 364 333 A1 | 4/1990 |
| FR | 2 741 956 A1 | 6/1997 |
| WO | 01/22117 A1 | 3/2001 |

OTHER PUBLICATIONS

Sheen, D.R.; Strawitch, C.M.; Lewis, T.B.; , "UHF wideband SAR design and preliminary results," Geoscience and Remote Sensing Symposium, 1994. IGARSS '94. Surface and Atmospheric Remote Sensing: Technologies, Data Analysis and Interpretation., International , vol. 1, no., pp. 289-291 vol. 1, Aug. 8-12, 1994.*

(Continued)

*Primary Examiner* — John B Sotomayor
(74) *Attorney, Agent, or Firm* — Baker & Hostetler LLP

(57) ABSTRACT

A system includes a pulsed UHF radar for integrating the signal received over a given integration time. The integration time for the received signal and the size of the distance bin are defined in such a way that, taking into account the range of speeds of the targets of interest, a moving target of interest travels only a distance shorter than the size of the distance bin from one integration period to another. Furthermore, the UHF radar implements a method of forming radar blips from the received signal to form elementary blips from the signals received over the chosen integration time and to store them from one burst to another. The method also confirms that the elementary blips formed probably correspond to targets of interest and then forms, from the confirmed elementary blips, aggregate blips, the attributes of an aggregate blip depending on the attributes of the confirmed elementary blips from which the aggregate blip stems. The method also validates the aggregate blips formed, the validation of an aggregate blip depending on the distance measurement associated with this blip. The transmission of parasitic blips is reduced, brought about by the detection of echos relating to the movement of vegetation due to the action of the wind, to the tracking means.

12 Claims, 2 Drawing Sheets

U.S. PATENT DOCUMENTS

| | | | | |
|---|---|---|---|---|
| 5,886,662 | A * | 3/1999 | Johnson | 342/25 A |
| 5,963,163 | A * | 10/1999 | Kemkemian et al. | 342/109 |
| 6,919,839 | B1 * | 7/2005 | Beadle et al. | 342/25 R |
| 6,963,301 | B2 * | 11/2005 | Schantz et al. | 342/125 |
| 7,006,034 | B1 * | 2/2006 | Krikorian et al. | 342/159 |
| 2002/0060639 | A1 | 5/2002 | Harman | |
| 2010/0134346 | A1 * | 6/2010 | Reuillon et al. | 342/160 |
| 2010/0225531 | A1 * | 9/2010 | Johnson | 342/25 A |
| 2011/0254724 | A1 * | 10/2011 | Ricci et al. | 342/28 |
| 2011/0254726 | A1 * | 10/2011 | Molin et al. | 342/95 |

OTHER PUBLICATIONS

Hellsten, H.; Ulander, L.; , "VHF/UHF synthetic aperture radar—principles and motivation," Signal Processing and Information Technology, 2003. ISSPIT 2003. Proceedings of the 3rd IEEE International Symposium on , vol., no., pp. 318-327, Dec. 14-17, 2003.*

Sheen, D.R.; Malinas, N.P.; Kletzli, D.W., Jr.; Lewis, T.B.; Roman, J.F.; , "Foliage transmission measurements using a ground-based ultrawide band (300-1300 MHz) SAR system," Geoscience and Remote Sensing, IEEE Transactions on , vol. 32, No. 1, pp. 118-130, Jan. 1994.*

Odile Adrian, et al., A Combination of NLOS Radar Technology and Los Optical Technology for Defence & Security, Institution of Engineering and Technology International Conference on Radar Systems, Oct. 15, 2007, pp. 40-45, XP002586575.

* cited by examiner

UHF RADAR SYSTEM FOR IMPLEMENTING A METHOD OF ELIMINATING VEGETATION CLUTTER

CROSS-REFERENCE TO RELATED APPLICATIONS

This application claims priority to foreign French patent application No. FR 09 06003, filed on Dec. 11, 2009, the disclosure of which is incorporated by reference in its entirety.

FIELD OF THE INVENTION

The present invention relates to the general field of protecting sensitive areas by means of detection systems. It relates more particularly to the protection of sensitive areas from the intrusion of individuals or vehicles moving at low speed and profiting from the presence of masks in order to be hidden. The term "mask" is understood here to mean elements, buildings or vegetation which alter the performance of the detection systems used and thus make it difficult, if not impossible, to detect intruders (individuals or vehicles) in the masked areas.

BACKGROUND OF THE INVENTION

At the present time, to make means available for protecting a sensitive area from any intrusions constitutes a challenge which is both difficult and poorly mastered. This is because, depending on the nature of the terrain constituting the area in question, the desired degree of selectivity and the permanent or temporary nature of the protection-installed, the solution to be implemented may take substantially different forms. Therefore, depending on the type of protection desired, it is necessary to determine the most appropriate type of protection systems from those available on the market. However, the proposed solutions at the present time are few in number and in general are not capable of simultaneously satisfying all the criteria defining the desired type of area protection.

A first known type of protection consists in installing a perimeter surveillance system comprising distributed sensors placed along a line defining the entry into the sensitive area, these sensors having the main role of detecting when this line is breached by one or more intruders. As is known, depending on the circumstances it is possible to use simple seismic sensors or, more sophisticatedly, barriers based on infrared sensors.

The detection elements used are generally defined by taking into account the temporary or permanent nature of the barrier installed and also the logistic criteria such as, for example, the ease of transporting these elements on a person's back or on a light vehicle, or else their speed of implementation, in order to form the desired protection barrier.

Advantageously, such systems are simple to operate, but they have a number of drawbacks.

Firstly, it should be noted that the protection offered by this type of protection is very generally limited to signalling an intrusion at the very instant when the breaching of the barrier thus formed occurs. In the most favourable case, this signalling is accompanied by information of varying precision, relating to the place where the barrier was breached. Therefore, these systems do not allow an anticipated signalling procedure to be carried out, one associated with the sensitive area being approached by possible intruders.

Secondly, it should also be noted that, after an intrusion has been detected, this type of protection generally no longer provides any information regarding the advance of the intruder in the sensitive area so that, unless there is a very rapid reaction, the search for the intruder(s) entails a complete search of the area.

Thirdly, it should also be noted that with regard to the particular case of systems using optical detectors or infrared detectors to form a perimeter barrier, the effectiveness of the barrier is generally worse when the atmosphere becomes too humid, so that detection is no longer automatically guaranteed.

Another known type of protection consists in installing a centrally located surveillance system based on the use of a short-range surveillance radar operating for example in the S band or in the X band and designed to keep the entire area to be protected under surveillance. The use of such a system has many advantages.

Firstly, it makes it possible both to detect the breaching of the line defining the boundary of the sensitive area and to monitor the space constituting this area.

Furthermore, such a radar system is largely insensitive to the weather conditions. It also makes it possible not only to detect an intrusion and to track the progress of the intruder, but also to know the intruder's rate of progress. It is then advantageously possible, by performing a qualitative analysis of the signal that has given rise to the indication of an intrusion, to determine the nature of the target and for example to determine whether the target is of the pedestrian or vehicle type. It is thus possible to determine, all at the same time, the nature of the intruder, the position of the point of intrusion and the movement of the intruder within the sensitive area.

In operational terms, the use of such a system also makes it possible for the work of monitoring the protected area to be advantageously simplified, notably by mobilizing only a single operator. Nevertheless, the use of such a solution does have drawbacks too:

it is generally expensive because of the degree of sophistication of the radar used;

owing to the use of a short-range surveillance radar operating in the S or X band, it proves to be inoperable whenever the space covered has elements that may form an obstacle to the direct propagation of the transmitted waves, because of the very wavelengths used. This is in particular the case if the presence of vegetation is noted in the area to be protected. In such a case, if the sensitive area includes wooded areas, the coverage of these wooded areas is not ensured so that an intruder can profit from their use in order to penetrate the sensitive area and progress therein without being immediately detected.

SUMMARY OF THE INVENTION

The object of the invention is to provide a means that has the main advantages of both known types of protection described above, without correspondingly having all the drawbacks thereof.

For this purpose, the subject of the invention is a radar system for protecting an area of terrain that includes spaces covered with vegetation. The system according to the invention comprises a fixed-antenna UHF radar designed and configured to cover the area in question. The radar constituting the system transmits bursts of pulses, integrates the signal received over a given integration time $T_i$ and temporally samples the received signal with a given sampling pitch that defines a signal analysis cell, or distance bin. According to the invention, since the integration time for the received signal and the size of the distance bin are defined in such a way that, taking into account the range of speeds of the targets of interest corresponding to potential intruders, a moving target of interest travels a distance shorter than the size of the distance bin from one integration period to another and the UHF radar implements a method of forming radar blips from the received signal, which method comprises the following steps:

a first step of forming elementary blips from the signals received over the chosen integration time;

a second step of storing the elementary blips formed, the elementary blips formed being stored from one burst to another, that is to say from one integration period to another, and the duration of a burst corresponding to the integration period;

a third step of confirming the elementary blips formed, by comparing the elementary blips formed for two successive bursts;

a fourth step of forming aggregate blips from confirmed elementary blips, the attributes of an aggregate blip depending on the attributes of the confirmed elementary blips used to form the aggregate blip in question; and a fifth step of validating the aggregate blips formed in the previous step, the validation of an aggregate blip depending on the distance measurement associated with this aggregate blip, the validated aggregate blips being transmitted to the tracking means of the radar.

According to a preferred embodiment, during the first step, the elementary blips formed are assigned attributes, the attributes of an elementary blip characterizing the corresponding target, namely: the distance bin in which the elementary blip was formed; the speed of the target at the origin of this elementary blip; the calculated azimuth; and the signal-to-noise ratio of the corresponding received signal.

According to a preferred embodiment, the third step confirms the elementary blips formed, an elementary blip formed for a burst p being confirmed if, during the burst p−1, an elementary blip having attributes with values substantially identical to those of the elementary blip in question was formed in the same distance bin or in an adjacent distance bin.

According to a preferred embodiment, the values of the attributes assigned to an aggregate blip depend on the values of the corresponding attributes of the confirmed elementary blips used to form this aggregate blip.

According to one particular variant of the previous embodiment, the values of the attributes assigned to an aggregate blip are defined by implementing a barycentric weighting operation defined by the following general equation:

$$Att_{ag} = (Att_p \cdot SNR_p + Att_{p-1} \cdot SNR_{p-1})/(SNR_p + SNR_{p-1})$$

in which $Att_{ag}$ corresponds to the attribute in question of the aggregate blip, $Att_p$ and $Att_{p-1}$ correspond to the attributes of the confirmed elementary blips and $SNR_p$ and $SNR_{p-1}$ correspond to the signal-to-noise ratios of the confirmed elementary blips.

According to a preferred embodiment, the aggregate blips created are divided during the fifth step into two categories, namely the validated blips and the non-validated blips, the non-validated blips being the blips resulting from the aggregation of confirmed elementary blips located in two adjacent distance bins.

According to a preferred embodiment, the aggregate blips created are divided during the fifth step into two categories, namely the validated blips and the non-validated blips, the non-validated blips being determined from the blips resulting from the aggregation of elementary blips located in two adjacent distance bins according to an a priori defined validation criterion.

According to one particular variant of the previous embodiment, the selection criterion used is a location criterion for the aggregate blip formed from two elementary blips located in two adjacent distance bins, this aggregate blip being non-validated if it is located in a space of the protected area covered with vegetation.

According to another particular variant of the previous embodiment, the selection criterion used is a weather condition criterion, the aggregate blips formed from two elementary blips located in two adjacent distance bins being non-validated if the area protected is swept by a wind of force and speed exceeding given values.

According to a preferred embodiment, when the aggregate blips are transmitted to the tracking means of the radar, each transmitted aggregate blip is assigned an attribute indicating whether it is a validated aggregate blip or a non-validated aggregate blip.

According to a preferred embodiment, only the validated aggregate blips are transmitted to the tracking means of the radar.

BRIEF DESCRIPTION OF THE DRAWINGS

The features and advantages of the invention will be better appreciated by virtue of the following description, which is supported by the appended figures that show.

DETAILED DESCRIPTION

The main drawbacks of using a surveillance radar to protect a given area stem in particular from the operating frequency generally allocated to surveillance radars. This is because, as already mentioned previously, a radar operating in the S or X radar band is, as is known, impeded in its operation by the presence of vegetation that acts as an obstacle to the propagation of the waves having frequencies lying within these bands. This is why the system employed in the context of the invention is a radar operating in the UHF band since, at these frequencies, the radar waves possess diffraction properties making it possible to see through a mask formed by a relief or by vegetation, so that the detection of objects within an area of vegetation is possible.

However, the use of a UHF radar to protect a given area from intrusions does not by itself solve all the detection problems associated with the presence of vegetation. This is because such protection by means of a short-range radar is generally provided for detecting the intrusion of an object progressing over the ground at a relatively low speed, for example pedestrians or motorized vehicles, these objects being identified by their speed of movement. However, the speed of progress of the intruders in question moving over the ground is lower when abundant vegetation is present.

Thus, apart from the problems due to the propagation of the waves, which problem is solved by the use of the UHF band, the presence of vegetation clutter poses a specific problem due to the movements of the vegetation, in particular when there is a wind, which create parasitic echos, the Doppler of which is close to the targets of interest (i.e. the intruders). Although it is easy to eliminate perturbations caused by isolated vegetation elements, the movement of which is by nature static, for example isolated trees, using learning processes or processes for tracking echos resulting from the movements corresponding to these elements, it is however difficult, in the presence of extensive vegetation, to distinguish between an echo due to an actual intrusion by a moving object into the observed area and the many parasitic echos due to the effect of wind on the vegetation, which effect is manifested by the propagation of a movement over the extent of the vegetation, in the manner of a wave motion. The number of parasitic echos created in the observed area is, in this case, too large to be eliminated by a simple learning process or by conventional tracking means, to the detriment of the overall detection capability of the system. In particular, this problem is all the greater when the Doppler of the echos produced by the vegetation corresponds to the spectrum for analysing the targets that it is desired to detect, in other words the intruders.

Figure 1:
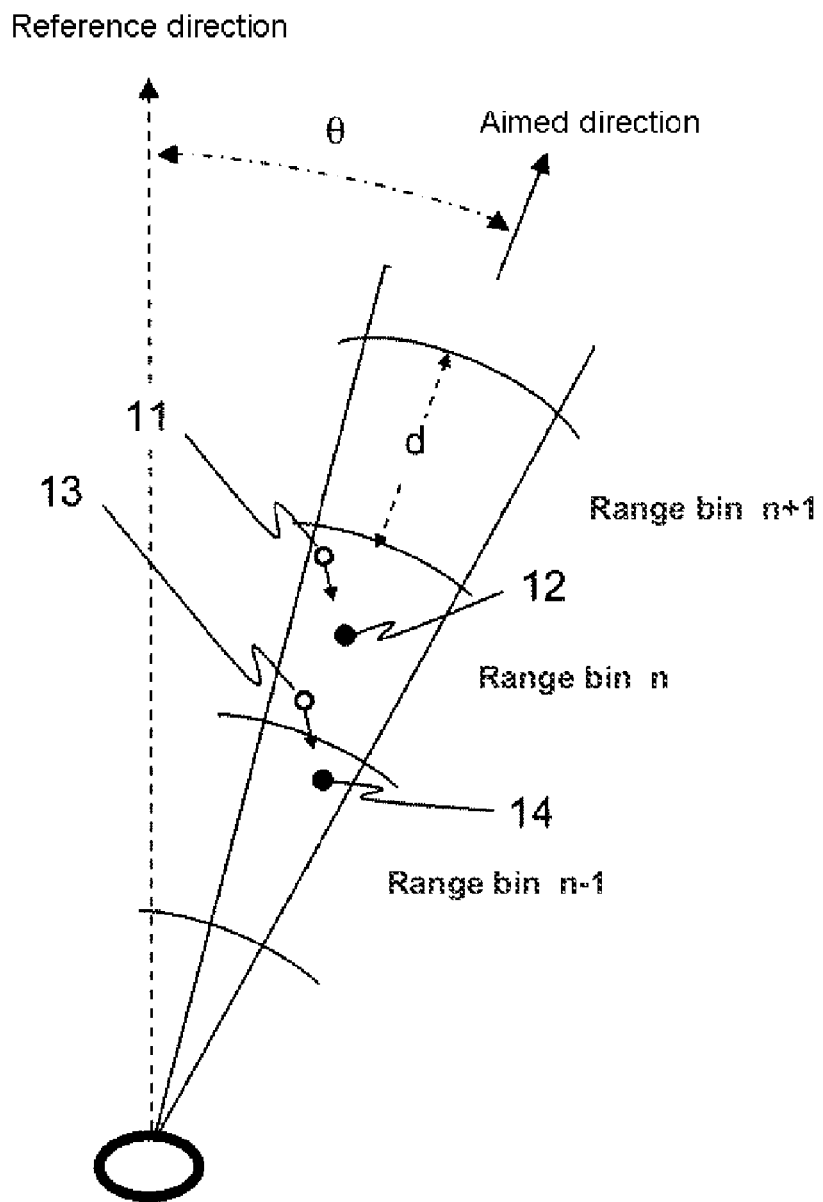
FIG. 1: a simplified diagram illustrating the configuration of the operation of the UHF radar according to the invention.

To solve this problem, the detection system according to the invention employs a radar for remotely analysing the space constituting the protected area with an analysis pitch, namely a distance bin of given length d. This radar is a short-range pulsed Doppler radar comprising means for transmitting a periodic pulsed signal in the UHF band and comprising a fixed antenna. This UHF radar is also designed to integrate the signal received over a given time $T_i$, this time corresponding to a burst of pulses. According to the invention as illustrated in FIG. 1, the length d of the distance bin and the integration time $T_i$ are determined so that, taking into account the size of the range of speeds in question for the targets of interest, a target of interest located in a given distance bin n over the integration time corresponding to a given burst (11) is located in the same distance bin n over the integration time corresponding to the next burst (12) or else, in the most unfavourable case, such that a target located in the distance bin n for a given burst (13) is located in one of the adjacent distance bins n−1 or n+1 (14). Moreover, the time $T_i$ is defined so that the signal-to-noise ratio of the signal received in the presence of a target of interest is sufficient to allow detection of the target irrespective of the position of the target in the area. The length d of the distance bin is itself also defined by the precision with which it is desired to know the distance of the detected target. However, it should be noted that this choice remains limited by the instantaneous frequency band (dependent on the duration of the pulses) which may take high values in the UHF band.

Advantageously, such a configuration makes it possible to differentiate an echo corresponding to the movement of vegetation (vegetation clutter), which movement is manifested by a Doppler frequency that leads one to believe a priori that the echo in question corresponds to a moving object, namely an intruder, from an echo actually corresponding to an intruder. This is because, between two consecutive bursts (i.e. two bursts separated by $T_i$), a target of interest, which moves relatively slowly, does not have the time to move over a long distance so that the corresponding detections are necessarily located within the same distance bin, or at least in two adjacent distance bins. However, in the presence of a large extent of vegetation, the wind blowing in this vegetation will bring about the erratic appearance of echos located in different distance bins from one integration period to another, i.e. for two consecutive bursts. Therefore, by applying appropriate processing it is advantageously possible to distinguish the echos corresponding to targets of interest from echos caused by the passage of the wind through an area of vegetation, even though the echos in question have similar characteristics (position, speed, azimuth, etc.).

As an illustration, it is possible for example to consider targets of interest moving within a-motion speed range extending from a few metres per second to around ten metres per second. A detection system according to the invention may in this case consist of a UHF radar having an integration time $T_i$ of around two seconds and sampling the received signal according to a decomposition of the space into distance bins with a length of 25 metres.

Figure 2:
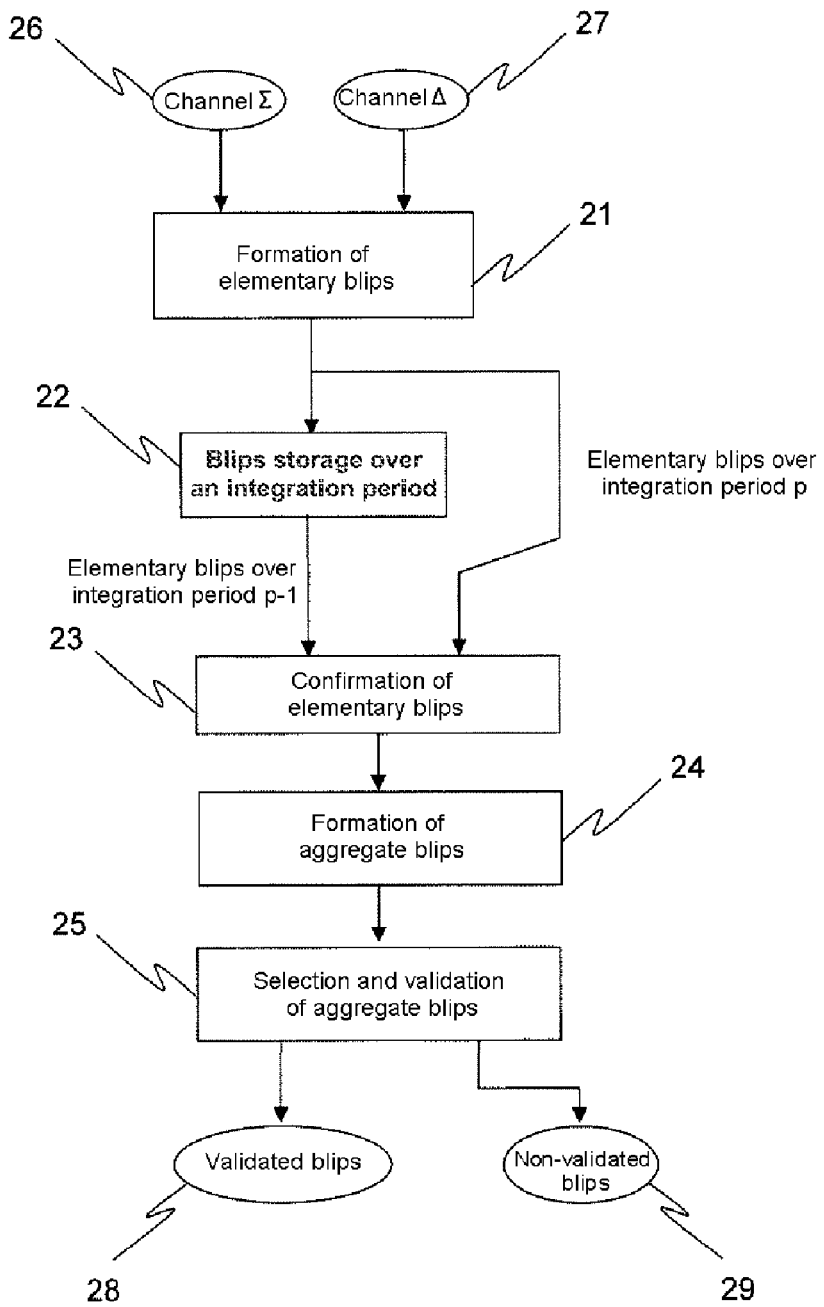
FIG. 2: a flowchart illustrating the principle of the method implemented by the UHF radar according to the invention.

Apart from the fact that it is designed to have particular integration-time and distance-sampling characteristics, the UHF radar constituting the detection system according to the invention includes signal processing and data processing means that implement a processing method intended to distinguish the echos produced by targets of interest, namely intruders, from those produced by the movements of the vegetation caused by wind. FIG. 2 illustrates diagrammatically the various steps of the method implemented.

Thus, the method implemented by the UHF radar according to the invention comprises the following steps:

a first step 21 of forming blips from the signals received for each burst, these blips being called elementary blips in the rest of the document;

a second step 22 of storing the elementary blips formed, the elementary blips formed being stored from one burst to another;

a third step 23 of confirming the presence of a target from the detections, by comparison of the elementary blips formed for two successive bursts;

a fourth step 24 of forming aggregate blips, an aggregate blip being formed from two elementary blips confirmed in the previous step, the attributes assigned to this aggregate blip depending on those of the confirmed elementary blips; and a fifth step 25 of validating the aggregate blips formed in the previous step.

The object of the method for processing the blips formed according to the invention is to transmit complementary information to the tracking means associated with the UHF radar, enabling these tracking means to determine the degree of likelihood of the aggregate blips transmitted to the tracking means being blips corresponding to targets of interest and not to vegetation clutter. Alternatively, the method may, beyond determining the degree of likelihood of the aggregate blips, carry out a filtering operation consisting in eliminating just the doubtful blips and transmitting only the blips deemed to be valid. The rest of the present document describes the various steps of this method in greater detail.

The first step 21 consists, for each burst of duration $T_i$, in determining, in a known manner, the in-phase component I and the quadrature component Q of the received signal for each sampling instant, the sampling period being determined by the size of the distance bin. In a preferred form of implementation, the UHF radar according to the invention has two receive channels 26 and 27, a sum (Σ) channel and a difference (Δ) channel of the radar, which make it possible to carry out angular deviation measurements.

During this first step, conventional processing is applied to the received signal in order to form elementary radar blips. In particular, this processing uses CFAR and Doppler filtering functions known to those skilled in the art and also a function for comparing the received signal level with a threshold, the exceeding of the threshold by the received signal, for a given distance bin, resulting in a detection corresponding to the formation of an elementary radar blip. An elementary radar blip is characterized by various attributes, among which are in general the distance (i.e. the distance bin), the speed (for example measured by Doppler analysis), the azimuth and the signal-to-noise ratio.

The second step 22 consists in storing the elementary blips formed during the first step, from one burst to another (i.e. from one integration period to another), so that the elementary blips formed for a burst p can be compared during step 23 with the elementary blips formed for the preceding burst p−1.

The third step 23 consists in confirming the detections made. This confirmation is performed in a sliding manner over time, by comparing the elementary blips formed during two successive bursts p−1 and p. This comparison is made by considering firstly each distance bin n separately and then, in a second stage, by considering each distance bin n with the adjacent bins n−1 and n+1.

Thus, according to the invention, a search is firstly made, for each distance bin, to find if an elementary blip formed for the burst p has attributes having values substantially identical to those of the attributes of an elementary blip formed for the preceding burst p−1.

In the affirmative, the two elementary blips are confirmed and will serve in step 24 to form what is called an aggregate blip. However, if the search for one and the same distance bin gave nothing, a search is then made, for each distance bin n, to find if an elementary blip formed for the burst p has attributes having values substantially the same as those of an elementary blip formed in an adjacent distance bin, n−1 or n+1, for the preceding burst p−1. In the affirmative, the two elementary blips are confirmed and will serve in step 24.

It should be noted that if the UHF radar is configured as indicated above, a target of interest, the speed of movement of which is defined as being relatively slow, generally moves between two bursts by a short distance so that the elementary blip formed by detecting this target during the burst p and the elementary blip formed by detecting this same object during the burst p−1 are located within the same distance bin. Therefore, these two elementary blips are confirmed in step 23 and will be advantageously aggregated during step 24.

However, the real targets located close to the boundaries of a distance bin at a given instant, the movement of which between two bursts leads to a change in distance bin, create elementary blips located in adjacent distance bins so that it is necessary, if it is desired to take these targets correctly into account, also to consider each distance bin with the adjacent bins. This is why step 23 secondly carries out the combined analysis of the adjacent distance bins. Consequently, any loss of detection is advantageously avoided.

It should also be noted that, as regards the elementary blips corresponding to the signals reflected by extended vegetation elements disturbed by the wind, these elementary blips will be formed erratically, from one burst to another, in the various distance bins over which these vegetation elements extend. Consequently, there is a low probability of finding, for two successive bursts, elementary blips formed in one and the same distance bin having attributes of substantially identical, or at the very least very similar, values. However, the probability of finding elementary detections due to the movement of the vegetation in two different distance bins is high.

Therefore, after the third step there are thus two groups of elementary blips, namely confirmed elementary blips and non-confirmed elementary blips. Depending on the mode of implementation in question, the non-confirmed elementary blips are eliminated.

The fourth step 24 of the method aggregates the confirmed elementary blips, that is to say those considered as corresponding to one and the same real target during the preceding step, so as to form a resultant blip or aggregate blip. This step also consists in characterizing an aggregate blip by attributes having values that depend on the values of the corresponding attributes of the elementary blips confirmed during step 23. According to the invention, the values of the attributes associated with the aggregate blips may be determined in various known ways.

Thus, the value of an attribute of an aggregate blip may be determined by taking the value of the attribute corresponding to the elementary blip most recently formed from the two confirmed elementary blips from which this aggregate blip stems, i.e. that corresponding to the burst p.

Alternatively, this value may be determined by calculating the mean of the values of the corresponding attributes of the two confirmed elementary blips from which the aggregate blip in question stems.

Also alternatively, and according to a preferred embodiment, this value may be determined by taking into account the values of the corresponding attributes of the two confirmed elementary blips and the signal-to-noise ratios associated with these elementary blips. Thus, it is possible to carry out a barycentric weighting operation defined by the following general equation:

$$\text{Att}_{ag} = (\text{Att}_p \cdot \text{SNR}_p + \text{Att}_{p-1} \cdot \text{SNR}_{p-1})/(\text{SNR}_p + \text{SNR}_{p-1}) \qquad [1]$$

in which $\text{Att}_{ag}$ corresponds to the attribute in question of the aggregate blip, $\text{Att}_p$ and $\text{Att}_{p-1}$ correspond to the attributes of the confirmed elementary blips and $\text{SNR}_p$ and $\text{SNR}_{p-1}$ correspond to the signal-to-noise ratios of the confirmed elementary blips.

Thus, each attribute of the aggregate blip may be calculated using the above equation.

After the fourth step 24, there are thus aggregate blips the attributes of which depend on the attributes of the confirmed elementary blips.

The fifth step 25 of the method according to the invention has the purpose of distinguishing the aggregate blips formed previously. As mentioned above, these aggregate blips may result from the aggregation of elementary blips that are consecutive in time and located within one and the same distance bin or else result from the aggregation of elementary blips that are consecutive in time and located in adjacent distance bins. In the first case, the probability that the aggregate blip corresponds to a target of interest is high. However, it is lower in the second case, it being possible that the aggregation carried out corresponds to the detection of vegetation. This is why the fifth step makes a distinction between these two cases and sorts the aggregate blips so as to separate the aggregate blips that have met the filtering criteria (validated blips 28) from the other aggregate blips (non-validated blips 29). Depending on the embodiment in question, the processing applied to the aggregate blips after sorting may take different forms.

Thus, according to a first embodiment, the processing of the aggregate blips after sorting may consist in validating the blips produced by the aggregation of elementary blips located within one and the same distance bin. The other aggregate blips, which do not meet this criterion, are themselves not validated. In the particular case in which the attributes of the aggregate blips are determined by barycentric weighting operation, the validated blips are therefore those for which the value of the distance attribute is a multiple of the length of the distance bin.

Thus, again, according to another embodiment, derived from the previous one, the processing applied consists not in validating the blips resulting from the aggregation of two elementary blips located in different distance bins only if the elementary blips in question are located at a point in the space corresponding to an area of vegetation liable to be the cause of echos due to this vegetation. In this embodiment, all the aggregate blips located outside such an area are validated. This embodiment assumes that the positions of the areas of vegetation must be known from elsewhere, for example by means of maps or else by learning.

Thus, again, according to another embodiment that may be combined with the previous ones, the processing applied consists in invalidating the blips resulting from the aggregation of two elementary blips located in different distance bins only if a wind is blowing that may generate detections in the Doppler spectrum. This embodiment assumes that there are means for measuring the force of the wind.

Other selection criteria, not described here, are also conceivable.

The aggregate blips not validated during the fifth step may, depending on the application in question, be processed differently.

Thus, it is possible for example for these blips to be purely and simply rejected—they are therefore not transmitted to the tracking means.

Alternatively, it is for example possible to retain all the aggregate blips, but by associating with each aggregate blip an attribute for distinguishing the validated aggregate blips from the non-validated aggregate blips.

The benefit of distinguishing between aggregate blips is that it provides additional information to the tracking means, which could adapt the processing according to the value of this attribute.

Thus, by using a UHF radar configured as described above and by equipping this radar with processing means designed to implement the method of detecting and eliminating parasitic echos produced by an area of vegetation blown by the wind, it is advantageously possible to produce an effective system for protecting an area despite the presence of vegetation, even when this vegetation undergoes a movement generating a Doppler signal through the action of the wind.

It should be noted that, depending on the embodiment adopted, the method according to the invention may result in the accidental elimination of blips corresponding to targets of interest, that is to say to intruders. This is why it is useful to optimally adapt the integration time and the size of the distance bin to the movement characteristics of the targets of interest. Likewise, it is important to select the filtering mode employed during the fifth step so as neither to impair the detection and tracking performance of the system nor degrade the false alarm probability.

It should also be noted that echos due to the movements of vegetation may give rise randomly to the formation within the same distance bin of elementary blips that are consecutive from one burst to another and that have identical attributes. The processing method according to the invention is then incapable of filtering the aggregate blips formed from these elementary blips. Then, they have to be eliminated by—the tracking algorithms to which they are transmitted. Thus, the method employed here constitutes a processing method complementary to the tracking methods normally employed. Its original function therefore does not allow it to be substituted for existing tracking processing operations, rather it filters out most of the echos due to the vegetation, thereby preventing the tracking means from becoming saturated and allowing the targets of interest to be correctly tracked.

The invention claimed is:

1. A radar system for protecting an area of terrain that includes spaces covered with vegetation, said system comprising a fixed-antenna UHF radar designed and configured to cover the area in question, the radar transmitting bursts of pulses, integrating the signal received over a given integration time $T_i$ and temporally sampling the received signal with a given sampling pitch that defines a signal analysis cell, or distance bin, the integration time for the received signal and the size of the distance bin being defined in such a way that, taking into account the range of speeds of the targets of interest corresponding to potential intruders, a moving target of interest travels a distance shorter than the size of the distance bin from one integration period to another and the radar implementing a method of forming radar blips from the received signal, said method comprising:
   a first step of forming elementary blips from the signals received over the chosen integration time;
   a second step of storing the elementary blips formed, the elementary blips formed being stored from one burst to another and the duration of a burst corresponding to the integration time;
   a third step of confirming the elementary blips formed, by comparing the attributes of elementary blips formed for two successive bursts and located within the same distance bin or in two adjacent distance bins, an elementary blip formed for a burst p being confirmed if, during the burst p−1, an elementary blip having attributes with values substantially identical to those of the attributes of the elementary blip in question was formed in the same distance bin or in an adjacent distance bin;
   a fourth step of forming aggregate blips from confirmed elementary blips, an aggregate blip having attributes depending on the attributes of the confirmed elementary blips used to form the aggregate blip in question; and
   a fifth step of validating the aggregate blips formed during the fourth step, the validation of an aggregate blip being based on criteria defined depending on whether it is formed from confirmed elementary blips situated in one and the same distance bin or based on confirmed elementary blips situated in two adjacent distance bins, the validated aggregate blips being transmitted to the tracking means of the radar.

2. The system according to claim 1, wherein, during the first step, the elementary blips formed are assigned attributes, the attributes of an elementary blip characterizing the corresponding target, namely the distance bin in which the elementary blip was formed; the speed of the target at the origin of this elementary blip; the calculated azimuth; and the signal-to-noise ratio of the corresponding received signal.

3. The system according to claim 2, wherein the values of the attributes assigned to an aggregate blip depend on the values of the corresponding attributes of the confirmed elementary blips used to form this aggregate blip.

4. The system according to claim 3, wherein the values of the attributes assigned to an aggregate blip are defined by implementing a barycentric weighting operation defined by the following equation:

$$\text{Att}_{ag}=(\text{Att}_p \cdot \text{SNR}_p+\text{Att}_{P-1} \cdot \text{SNR}_{p-1})/(\text{SNR}_p+\text{SNR}_{p-1})$$

in which $\text{Att}_{ag}$ corresponds to the attribute in question of the aggregate blip, $\text{Att}_p$ and $\text{Att}_{p-1}$ correspond to the attributes of the confirmed elementary blips and $\text{SNR}_p$ and $\text{SNR}_{p-1}$ correspond to the signal-to-noise ratios of the confirmed elementary blips.

5. The system according to claim 3, wherein the aggregate blips are divided during the fifth step into two categories, namely the validated blips and the non-validated blips, the non-validated blips being the blips resulting from the aggregation of confirmed elementary blips located in two adjacent distance bins.

6. The system according to claim 3, wherein the aggregate blips are divided during the fifth step into two categories, namely the validated blips and the non-validated blips, the non-validated blips being determined from the blips resulting from the aggregation of elementary blips located in two adjacent distance bins according to the defined validation criterion.

7. The system according to claim 6, wherein the selection criterion used is a location criterion for the aggregate blip formed from two elementary blips located in two adjacent distance bins, this aggregate blip being non-validated if it is located in a space of the protected area covered with vegetation.

8. The system according to claim 6, wherein the selection criterion used is a weather condition criterion, the aggregate blips formed from two elementary blips located in two adjacent distance bins being non-validated if the area protected is swept by a wind of force and speed exceeding given values.

9. The system according to claim 2, wherein the third step confirms the elementary blips formed, by searching, firstly, for each distance bin, if an elementary blip formed for the burst p has attributes having values substantially identical to those of the attributes of an elementary blip formed for the preceding burst p−1, and then, if the result is negative, by searching, secondly, for each distance bin n, if an elementary blip formed for the burst p has attributes having values substantially identical to those of the attributes of an elementary blip formed in an adjacent distance bin, either n−1 or n+1, for the preceding burst p−1, two blips satisfying the first search criterion or the second search criterion constituting two confirmed elementary blips achieves the confirmation of the elementary blips formed, an elementary blip formed for the burst p being confirmed if an elementary blip having attributes with values substantially identical to those of the attributes of the considered elementary blip has been formed for the preceding burst p−1 in the same distance bin or in an adjacent distance bin.

10. The system according to claim 1, wherein the third step confirms the elementary blips formed, by searching, firstly, for each distance bin, if an elementary blip formed for the burst p has attributes having values substantially identical to those of the attributes of an elementary blip formed for the preceding burst p−1, and then, if the result is negative, by searching, secondly, for each distance bin n, if an elementary blip formed for the burst p has attributes having values substantially identical to those of the attributes of an elementary blip formed in an adjacent distance bin, either n−1 or n+1, for the preceding burst p−1, two blips satisfying the first search criterion or the second search criterion constituting two confirmed elementary blips achieves the confirmation of the elementary blips formed, an elementary blip formed for the burst p being confirmed if an elementary blip having attributes with values substantially identical to those of the attributes of the considered elementary blip has been formed for the preceding burst p−1 in the same distance bin or in an adjacent distance bin.

11. The system according to claim 1, wherein, when all the aggregate blips are transmitted to the tracking means of the radar, each transmitted aggregate blip is assigned an attribute indicating whether it is a validated aggregate blip or a non-validated aggregate blip.

12. The system according to claim 1, wherein only the validated aggregate blips are transmitted to the tracking means of the radar.

* * * * *